(12) United States Patent
Feng

(10) Patent No.: US 9,435,657 B2
(45) Date of Patent: Sep. 6, 2016

(54) NAVIGATION SYSTEM WITH AN ITINERARY PLANNING MECHANISM AND METHOD OF OPERATION THEREOF

(71) Applicant: Telenav, Inc., Sunnyvale, CA (US)

(72) Inventor: Hongwei Feng, Palo Alto, CA (US)

(73) Assignee: Telenav, Inc., Santa Clara, CA (US)

(*) Notice: Subject to any disclaimer, the term of this patent is extended or adjusted under 35 U.S.C. 154(b) by 0 days.

(21) Appl. No.: 14/596,945

(22) Filed: Jan. 14, 2015

(65) Prior Publication Data

US 2016/0202076 A1 Jul. 14, 2016

(51) Int. Cl.
G01C 21/00 (2006.01)
G01C 21/34 (2006.01)

(52) U.S. Cl.
CPC .................. *G01C 21/343* (2013.01)

(58) Field of Classification Search
CPC  G01C 21/00; G01C 21/343; G01C 21/3647; G01C 21/3476; G09B 29/008; G06Q 30/0266; G06Q 10/047
USPC ....... 701/408, 400, 428, 409, 533, 426, 438, 701/516, 526; 340/988, 995.1, 995.19; 382/305, 306, 213; 455/457, 456.3
See application file for complete search history.

(56) References Cited

U.S. PATENT DOCUMENTS

| | | | |
|---|---|---|---|
| 8,543,520 B2 | 9/2013 | Diao | |
| 2004/0078813 A1* | 4/2004 | Kobuya | G01C 21/20 725/46 |
| 2007/0185744 A1* | 8/2007 | Robertson | G06Q 10/02 705/5 |
| 2009/0265651 A1* | 10/2009 | Hodson | G06Q 50/14 715/769 |
| 2011/0238290 A1 | 9/2011 | Feng et al. | |
| 2015/0134247 A1* | 5/2015 | Kobuya | G01C 21/3679 701/533 |

* cited by examiner

*Primary Examiner* — Dalena Tran
(74) *Attorney, Agent, or Firm* — IP Investment Law Group

(57) ABSTRACT

A navigation system includes: a storage interface, configured to access a travelogue image for depicting an interest point; a control unit, coupled to the storage interface, configured to generate an extracted interest set including the interest point based on the travelogue image; generate a travel itinerary including an activity sequence based on the extracted interest set; calculate a navigation route based on the travel itinerary and the extracted interest set for accessing the interest point; and generate an attraction suggestion based on the travel itinerary and the navigation route for recommending an attraction point other than the interest point indicated in the travelogue image along the navigation route.

20 Claims, 8 Drawing Sheets

NAVIGATION SYSTEM WITH AN ITINERARY PLANNING MECHANISM AND METHOD OF OPERATION THEREOF

TECHNICAL FIELD

The present invention relates generally to a navigation system, and more particularly to a system with an itinerary planning mechanism.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to use location information to provide navigation services for vacation or sightseeing excursions.

However, navigation services for vacation or sightseeing excursions often present challenges unmet by existing navigation solutions. Thus, a need still remains for a navigation system with an itinerary planning mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a storage interface, configured to: access a travelogue image for depicting an interest point; a control unit, coupled to the storage interface, configured to: generate an extracted interest set including the interest point based on the travelogue image; generate a travel itinerary including an activity sequence based on the extracted interest set; calculate a navigation route based on the travel itinerary and the extracted interest set for accessing the interest point; and generate an attraction suggestion based on the travel itinerary and the navigation route for recommending an attraction point other than the interest point indicated in the travelogue image along the navigation route.

An embodiment of the present invention provides a method of operation of a navigation system including: generating, with a control unit, an extracted interest set including an interest point based on a travelogue image; generating a travel itinerary including an activity sequence based on the extracted interest set; calculating a navigation route based on the travel itinerary and the extracted interest set for accessing the interest point; and generating an attraction suggestion based on the travel itinerary and the navigation route for recommending an attraction point other than the interest point indicated in the travelogue image along the navigation route.

An embodiment of the present invention provides a non-transitory computer readable medium including: generating an extracted interest set including an interest point based on a travelogue image; generating a travel itinerary including an activity sequence based on the extracted interest set; calculating a navigation route based on the travel itinerary and the extracted interest set for accessing the interest point; and generating an attraction based on the travel itinerary and the navigation route for recommending an attraction point other than the interest point indicated in the travelogue image along the navigation route.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
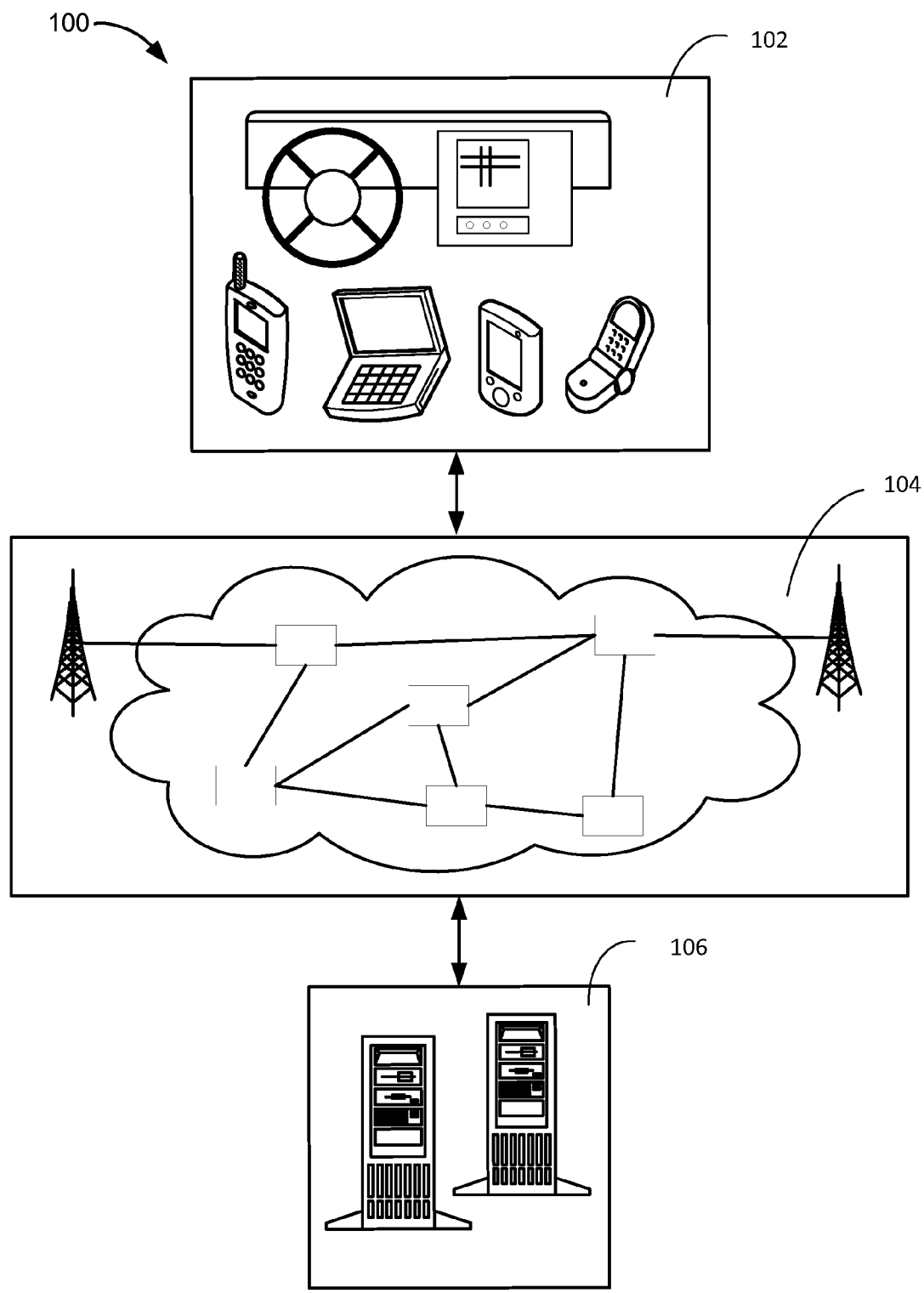
FIG. 1 is a navigation system with an itinerary planning mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims sections below, the modules are deemed to include hardware circuitry for the purposes and the scope of the apparatus claims.

Referring now to FIG. 1, therein is shown a navigation system 100 with an itinerary planning mechanism in an embodiment of the present invention. The navigation system 100 includes a first device 102, such as a client or a server, connected to a second device 106, such as a client or a server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or a device incorporated with a vehicle, for example a car, a truck, a bus, a ship or a boat, a plane, a train, or a combination thereof. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
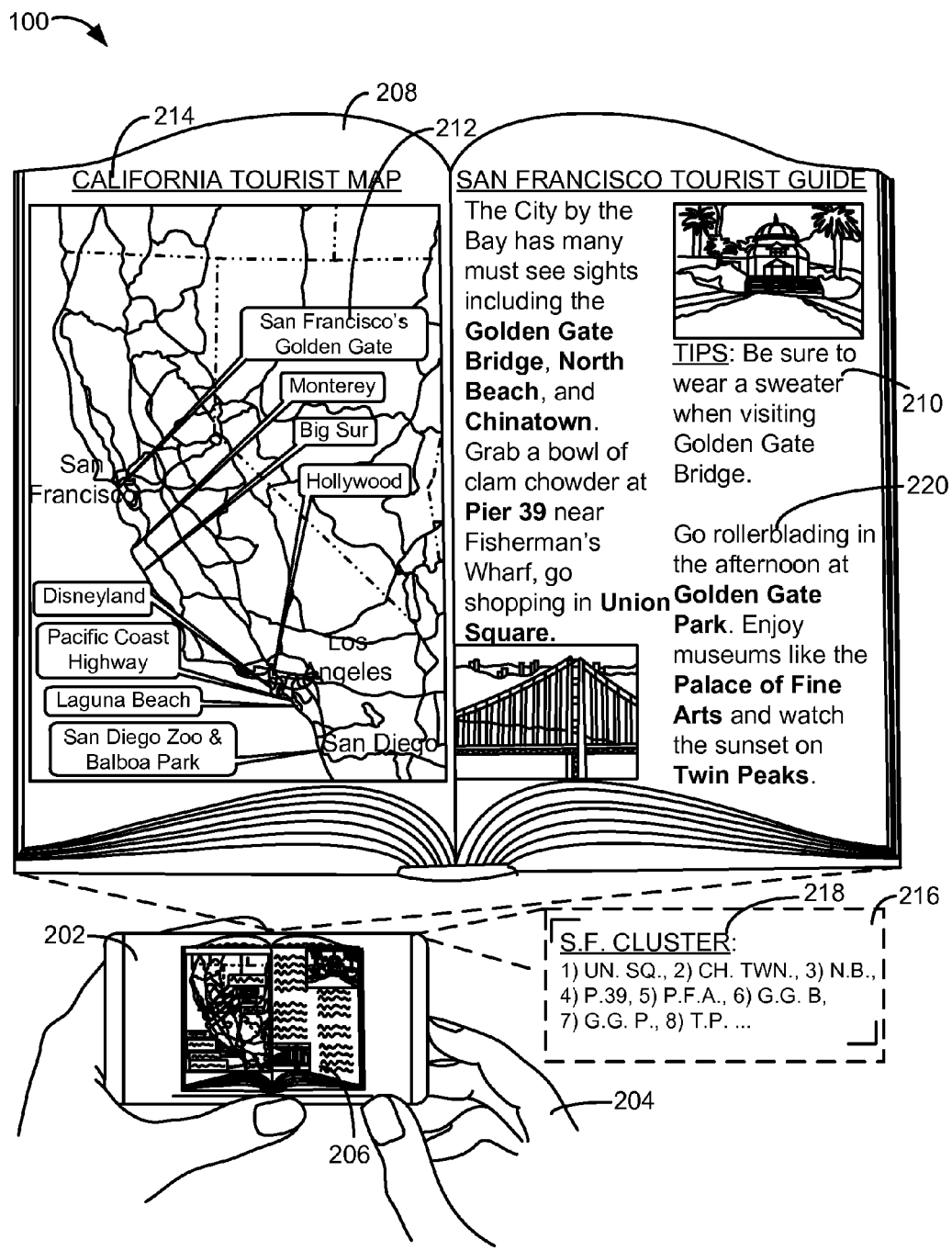
FIG. 2 is an example of a display on a display interface of the first device.

Referring now to FIG. 2, therein is shown an example of a display interface 202 of the first device 102 held by a user 204 of the navigation system 100. The display interface 202 can depict a travelogue image 206 of a travelogue 208. The travelogue image 206 is a representation of the travelogue 208 captured by the first device 102, the second device 106, or a combination thereof. The travelogue 208 is a written description or illustration concerning travel destinations or activities.

For example, the travelogue 208 can include a tour guide, a guidebook, a travel guide, a map, a tourism guide, a tourism pamphlet, a sign or a map erected or available at locations of interest, an image or display of an online travel website or review website, or a combination thereof. The travelogue 208 can also include a medium for information, such as for printed material or physical structures including information.

As depicted in FIG. 2, the travelogue image 206 can include a number of candidate points 212. The candidate points 212 can include point of interest (POI) relevant for the user or associated with the travelogue 208.

For example, the candidate points 212 can include a sightseeing destination such as a vista point or a landmark. As an additional example, the candidate points 212 can include a dining establishment such as a restaurant or a diner. As yet another example, the candidate points 212 can include a lodging destination such as a hotel or a bed-and-breakfast. As a further example, the candidate points 212 can include a shopping destination such as a store or a mall. As yet another example, the candidate points 212 can include a natural destination such as a park, a river, or a lake. As further examples, the candidate points 212 can include a cultural institution or performance venue such as a museum, an archive, a stadium, or a concert hall.

The travelogue 208 can represent or describe the candidate points 212 organized by a geographic area 214. The geographic area 214 can include a set of boundaries or regional delineations for classifying the geography of the candidate points 212. The geographic area 214 can include a municipality such as a city or unincorporated region, a county, a state, a province, a country, a continent, or a combination thereof. The geographic area 214 can further include a boundary, such as an accessible area or a property boundary, associated with an overarching destination area described by the travelogue 208.

The travelogue 208 can also include a travelogue suggestion 210. The travelogue suggestion 210 is a recommendation or advice provided by the travelogue 208 concerning a visitation to the candidate points 212. For example, the travelogue suggestion 210 can include descriptions, background information, historical information, interesting facts, cautionary warnings, directions, tips, operating hours, clothing attire recommendations, or a combination thereof concerning the candidate points 212.

The navigation system 100 can generate an extracted interest set 216 based on the travelogue image 206. The extracted interest set 216 is a collection of data or information obtained from the travelogue image 206 concerning the candidate points 212. The extracted interest set 216 can include text, images, or multimedia content concerning the candidate points 212. The extracted interest set 216 will be discussed in detail in the sections below.

The extracted interest set 216 can classify the candidate points 212 by an activity type 220, a geographic cluster 218, or a combination thereof. The activity type 220 is a categorization or a grouping identification for a travel-related deed or action commonly undertaken at the candidate points 212. For example, the activity type 220 can be categorized by the amount of physical exertion required to undertake the activity. As a more specific example, the activity type 220 can involve high levels of physical activity including swimming, kayaking, or biking; moderate levels of physical activity including hiking, boating, or sightseeing, low levels of physical activity including dining or attending a spectator event, or a combination thereof.

As an additional example, the activity type 220 can be categorized by an activity locale such as outdoors or indoors. In addition, the activity type 220 can be categorized by the cost of the activity including a paid activity, a donation-based activity, a free activity, or a combination thereof.

The geographic cluster 218 represents a grouping of points of interest or destinations by the geographic area 214. For example, one instance of the geographic cluster 218 can group the candidate points 212 by city and another instance of the geographic cluster 218 can group the candidate points 212 by neighborhoods in the city. Also for example, the geographic cluster 218 can be based on relative distances between the candidate points 212, density of the candidate points 212 for a geographic area or location, or a combination thereof.

Figure 3:
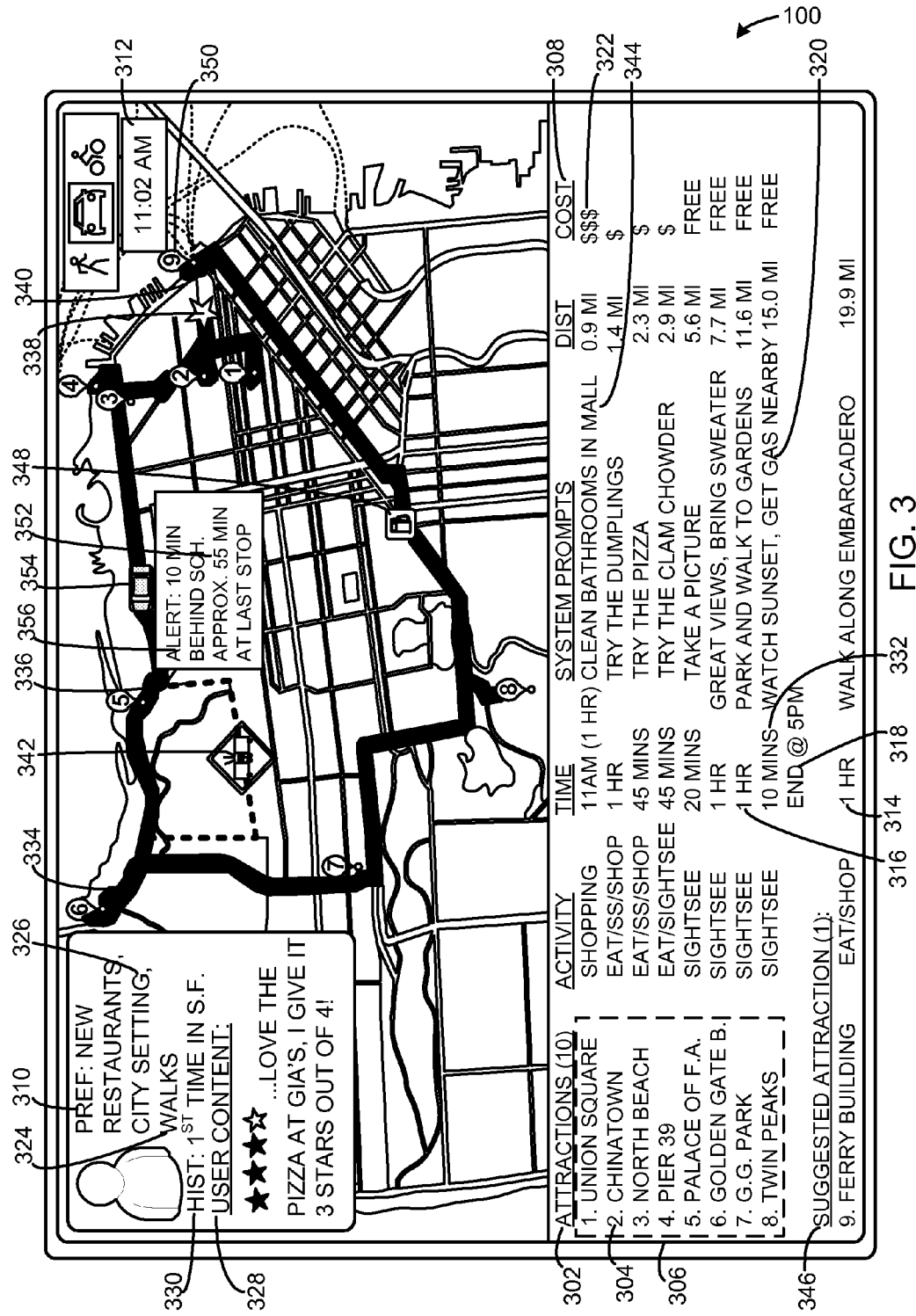
FIG. 3 is an example of another display on the display interface of the first device.

Referring now to FIG. 3 therein is shown another example display on the display interface 202 of the first device 102 of FIG. 1. The display interface 202 can depict a travel itinerary 302 including one or more instances of an interest point 304.

The travel itinerary 302 is a schedule or map of travel destinations arranged by the order in which the travel destinations will be visited. For example, the travel itinerary 302 can be a dynamic schedule or map of instances of the interest point 304 arranged by an activity sequence 306. The travel itinerary 302 can be displayed as a table, a list, an annotated map, entries in a calendar or scheduling application, or a combination thereof.

For example, the activity sequence 306 can order instances of the interest point 304 by an estimated arrival time, a time range, a geographic sequence, a navigation order, an estimated importance or preference, or a combination thereof. As a more specific example, the activity sequence 306 can include all instances of the interest point 304 which can be visited during a specific duration, such as before or between meals or relative to an appointment. As an additional example, the activity sequence 306 can present the order as geographic regions which can be visited in a particular time period. As a more specific example, the activity sequence 306 can order the travel itinerary 302 by neighborhoods in a city.

The interest point 304 can include a sightseeing destination, a dining establishment, a lodging destination, a shopping destination, a natural destination, a sporting destination, a cultural institution, a performance venue, or a combination thereof.

The travel itinerary 302 can include an activity type 220. For example, the activity type 220 can be organized by the level of physical exertion involved with an activity associated with the interest point 304. As an additional example, the activity type 220 can involve whether instances of the interest point 304 offers an indoor activity or an outdoor activity.

The display interface 202 can also depict a travel context 312, a resource constraint 308, a user preference 310, or a combination thereof. The travel context 312 is a set of circumstances or conditions surrounding a travel excursion. For example, the travel context 312 can include a travel day, a travel time, or a combination thereof. Also for example, the travel context 312 can include a stated or derived purpose, importance, goal, information or parameters associated therewith, or a combination thereof.

The resource constraint 308 represents information or data concerning a limitation or scarcity concerning an asset. The resource constraint 308 can include a time constraint 314, a fuel constraint 320, a budgetary constraint 322, or a combination thereof.

The time constraint 314 can be information or data concerning the amount of time the user 204 has to visit or access one or more instances of the interest point 304. The time constraint 314 can be set by a start time 316, an end time 318, or a combination thereof concerning a trip or visit. For example, the start time 316 can be based on a flight arrival time, a vehicular arrival time, or a combination thereof. The end time 318 can be based on a flight departure time, a vehicular departure time, a meeting time, a closing time, or a combination thereof.

The fuel constraint 320 represents the amount of natural resources detected in a vehicle or mode of transportation for traversing to one or more destinations included as part of the travel itinerary 302. For example, the fuel constraint 320 can refer to the amount of fuel or energy the user 204 has available to travel to the destinations on the travel itinerary 302. In addition, the fuel constraint 320 can refer to a fuel or energy cost.

The budgetary constraint 322 represents the amount of monetary assets available to the user or as the user 204 intends to allocate a trip or journey. For example, the budgetary constraint 322 can refer to the amount of foreign currency the user 204 has or intends to spend in a foreign country. As an additional example, the budgetary constraint 322 can refer to the amount of money the user 204 has or intends to spend for a particular activity at the interest point 304.

The user preference 310 is a predilection or interest of the user 204 for undertaking an activity or traveling to a destination. The user preference 310 can include an activity preference 324, a geographic preference 326, or a combination thereof. The activity preference 324 is an instance of the user preference 310 concerning the activity type 220. For example, the activity preference 324 can be a preference of the user 204 for outdoor activities, musical activities, or a combination thereof.

The geographic preference 326 is an instance of the user preference 310 concerning a preferred instance of the geographic area 214. For example, the geographic preference 326 can be a preference of the user 204 for a state such as California or Oregon, a geographic region such as the Pacific Northwest, the Appalachian Mountains, or a combination thereof. Also for example, the geographic preference 326 can include a specific preference such as a category of areas or locations or a relative preference such as mountains over beaches or metropolitan areas over rural areas.

The navigation system 100 can determine the user preference 310 based on a user-generated content 328, a navigation history 330, or a combination thereof. The user-generated content 328 is online or offline content attributed to or generated by the user 204. For example, the user-generated content 328 can include user-generated reviews, user-generated commentary, user photos, written communication, or a combination thereof.

The navigation history 330 refers to previous routes or destinations such as points of interest, landmarks, or geographic regions traversed by the user 204 or saved in a navigation application of the first device 102, the second device 106, or a combination thereof. The navigation system 100 can use the navigation history 330 to determine when the user 204 has previously visited an instance of the interest point 304 or the candidate points 212.

The travel itinerary 302 can also include a proposed stoppage duration 332 for each instance of the interest point 304. The proposed stoppage duration 332 is the amount of visitation time, travel time, or a combination thereof allocated to each instance of the interest point 304 included as part of the travel itinerary 302. For example, the proposed stoppage duration 332 can range from 5 minutes to multiple days.

The display interface 202 can also depict a navigation route 334. The navigation route 334 is a path generated by the navigation system 100 for guiding the user 204 or a mode of transportation to one or more destinations included as part of the travel itinerary 302. The navigation system 100 can calculate the navigation route 334 based on one or more candidate routes 336. The candidate routes 336 are potential instances of the navigation route 334 for guiding the user 204 or a mode of transportation to the candidate points 212, the interest point 304, or a combination thereof.

The display interface 202 can also depict a starting location 338, an endpoint 340, a traffic condition 342, or a combination thereof. The traffic condition 342 can be depicted on the navigation route 334 or through a notification window. The traffic condition 342 can include information or data concerning a road closure, an accident, a traffic pace, or a combination thereof. The traffic condition 342 can be presented on the navigation route 334 as a graphic, a pop-up window, or a combination thereof.

The travel itinerary 302, the navigation route 334, or a combination thereof can depict a convenience suggestion 344, an attraction suggestion 346, or a combination thereof. The convenience suggestion 344 is a recommendation generated by the navigation system 100 for stopping at a convenience point 348. The convenience point 348 is a point of interest or destination for satisfying a biological or logistical need or desire of the user 204. For example, the convenience point 348 can include a fueling station, a dining establishment, a restroom stop, a lodging establishment, or a combination thereof.

The attraction suggestion 346 is a recommendation generated by the navigation system 100 for visiting an attraction point 350 not included as one of the candidate points 212 depicted in the travelogue image 206. The attraction point 350 is a point of interest or destination suggested by the navigation system 100 and not included as part of the travelogue image 206. For example, the attraction point 350 can be an instance of the interest point 304 recommended by the navigation system 100 but not included as part of the travelogue suggestion 210.

The navigation system 100 can also monitor a detour period 352 at the interest point 304. The detour period 352 is the actual amount of time spent by the user 204 or the actual amount of time a mode of transportation stops at the interest point 304. The navigation system 100 can monitor the detour period 352 based on a current location 354 and a current time relative to a temporal or locational information included as part of the travel itinerary 302, the navigation route 334, or a combination thereof.

For example, the current location 354 can be a present geographic location of the user 204 as reported by a GPS unit of a device carried by the user 204. The current location 354 can show the user 204 is behind schedule with regard to the travel itinerary 302 and is not able to arrive at an instance of the interest point 304 by a previously scheduled time.

The navigation system 100 can generate an interest alert 356 when the detour period 352 at any instance of the interest point 304 exceeds the proposed stoppage duration 332. The interest alert 356 is a notification or warning message concerning the interest point 304. For example, the interest alert 356 can include information concerning a closing time of a museum included as part of the travel itinerary 302.

Figure 4:
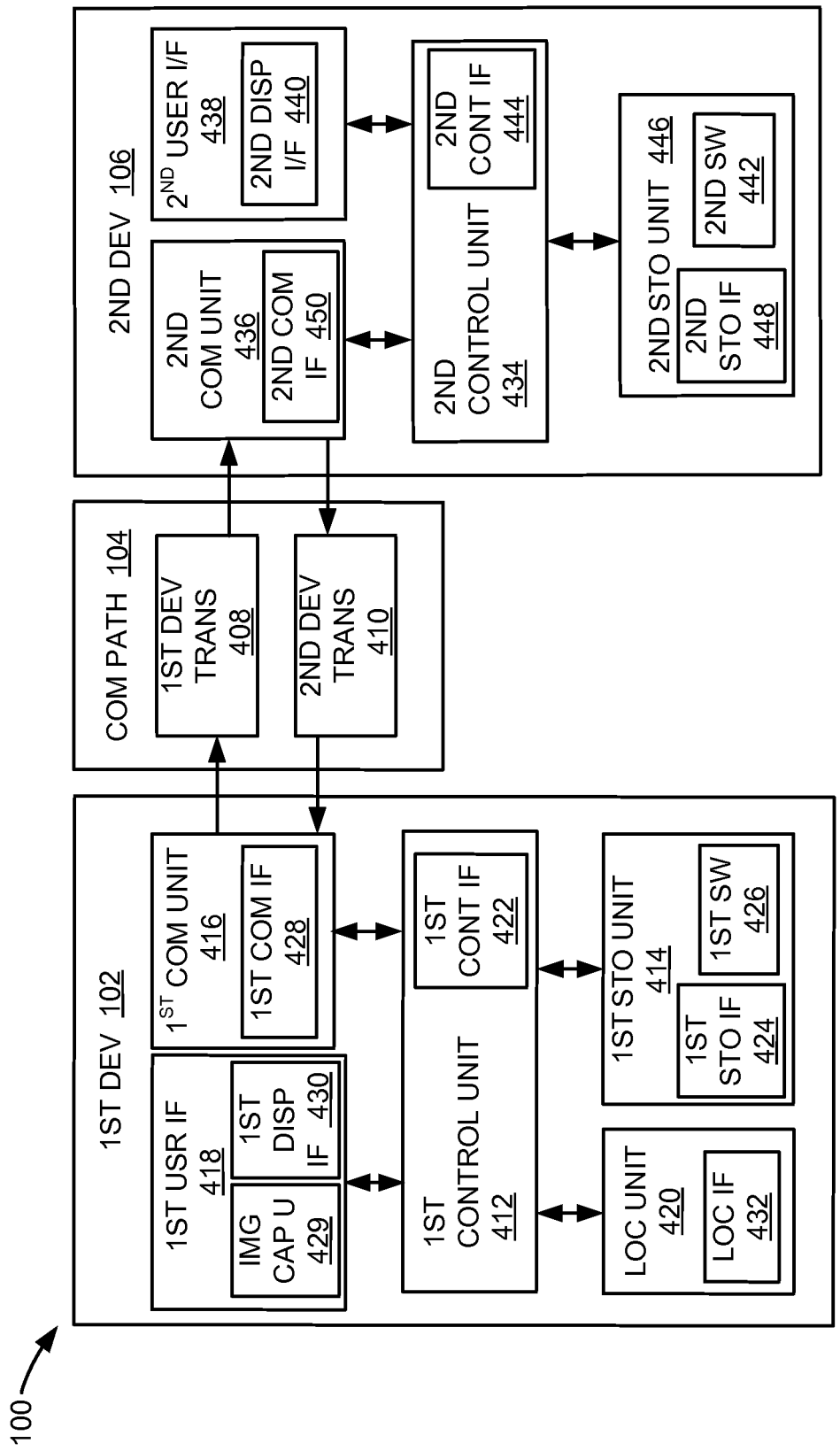
FIG. 4 is an exemplary block diagram of the navigation system.

Referring now to FIG. 4 therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate a location or movement information, including a geographic position, a heading, an inertial orientation, a speed, an altitude, or a combination thereof or a change therein of the first device 1002. The location unit 420 can be implemented in many ways.

For example, the location unit 420 can function as at least a part of a global positioning system (GPS), a global navigation satellite system (GLONASS), an inertial navigation system, a cellular-tower location system, a pressure location system, or any combination thereof. The location unit 220 can include an accelerometer, a gyroscope, an airspeed indicator, a compass, a heading indicator, an altimeter, an automatic dependent surveillance-broadcast (ADS-B) transponder, or a combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, point of interest (POI), navigation routing entries, reviews/ratings, feedback, traffic patterns, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include an image capture unit 429, a first display interface 430, or a combination thereof. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The image capture unit 429 can capture static images, video, light reflectance, IR signatures, UV signatures, or a combination thereof. The image capture unit 429 can be implemented in many ways. For example, the image capture unit 429 can be implemented as one or more two-dimensional cameras, optical sensors, low-light cameras, infrared (IR) sensors, ultraviolet (UV) sensors, thermal imaging cameras, or a combination thereof.

Also, for illustrative purposes, the image capture unit 429 is shown as being embedded in the first device 102. However, it is understand that the image capture unit 429 can operate on the periphery or outside of the first device 102. For example, the image capture unit 429 can be a three-dimensional camera coupled to the first device 102.

The image capture unit 429 can include a front-facing camera, a rear-facing camera, or a combination thereof. The front-facing camera is a portion of the image capture unit 429 having a lens or light capture component on substantially the same side as the first display interface 430. The rear-facing camera is a portion of the image capture unit 429 having a lens on the opposite side as the first display interface 430. The front-facing camera and the rear-facing camera can work simultaneously to capture images on both sides of the first device 102.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POIs), navigation routing entries, reviews/ratings, feedback, traffic patterns, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
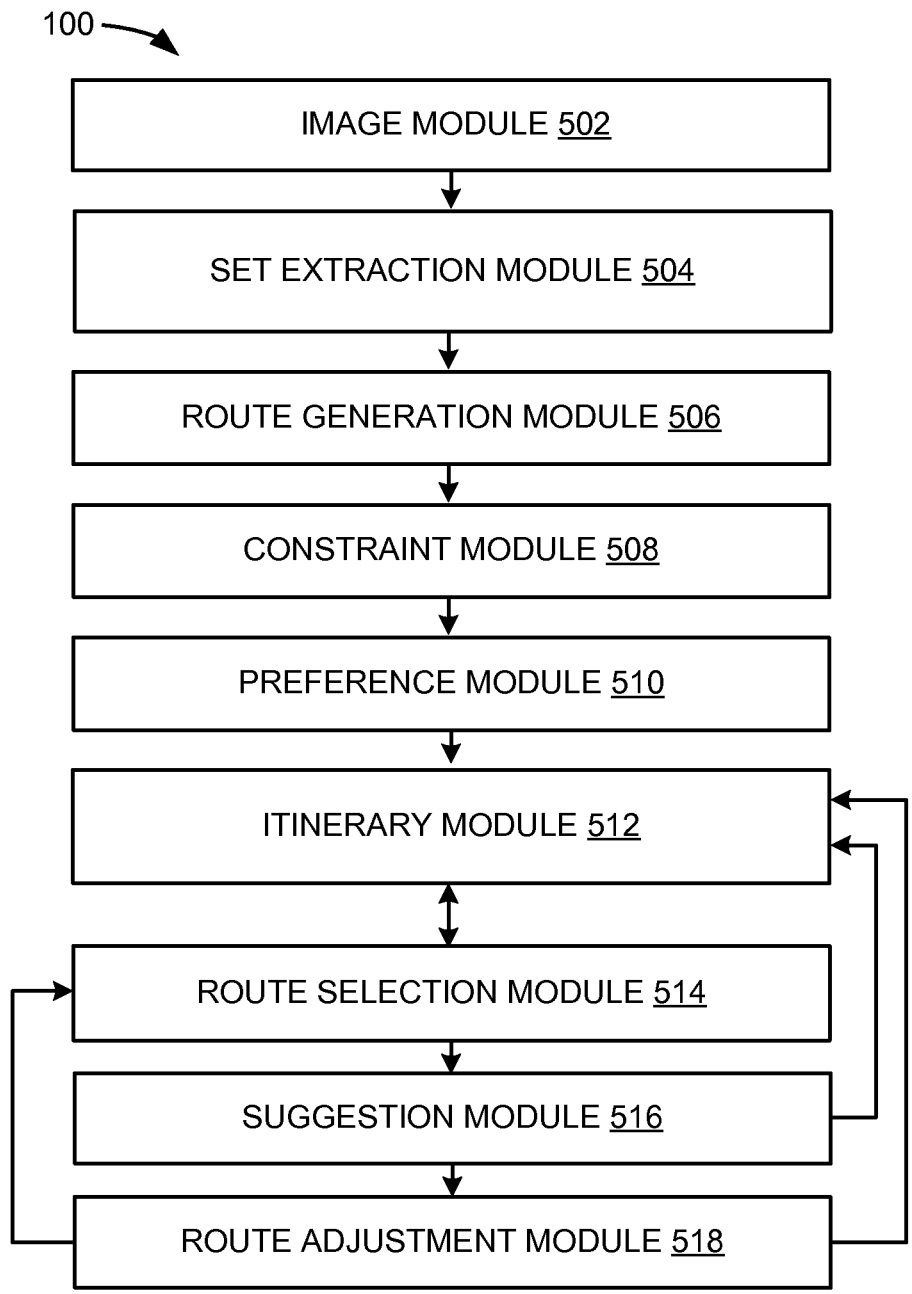
FIG. 5 is a control flow of the navigation system.

Referring now to FIG. 5, therein is shown a control flow of the navigation system 100 with an itinerary planning mechanism. The navigation system 100 can include an image module 502, a set extraction module 504, a route generation module 506, a constraint module 508, a preference module 510, an itinerary module 512, a route selection module 514, a suggestion module 516, a route adjustment module 518, or a combination thereof.

The modules can be coupled by having the input of one module connected to the output of another module as shown in FIG. 5. The modules can be coupled by using wired or wireless connections, the communication path 104 of FIG. 1, instructional steps, or a combination thereof. The modules can be coupled directly, without any intervening structures other than the structure providing the direct connection. The modules can further be coupled indirectly, through a shared connection or other functional structures between the coupled modules.

The image module 502 is configured to capture the travelogue image 206 of FIG. 2. The image module 502 can capture the travelogue image 206 for obtaining data or information concerning the candidate points 212 of FIG. 2.

The image module 502 can capture the travelogue image 206 in a number of ways. The image module 502 can capture the travelogue image 206 by using the image capture unit 429 to capture a digital image of a portion of the travelogue 208 of FIG. 2. For example, the first device 102 can be a mobile phone and the travelogue 208 can be a tour guide. In this example, the image module 502 can capture the travelogue image 206 by using the rear-facing camera of the mobile phone to capture one or more pages from the tour guide.

As an additional example, the first device 102 can be a tablet device and the image module 502 can capture the travelogue image 206 when the user 204 of FIG. 2 holds a portion of the travelogue 208 in front of the image capture unit 429 of the tablet device. As yet another example, the first device 102 can be a wearable device such as a head-mounted device or an eyeglass computing device and the image module 502 can capture the travelogue image 206 when the user 204 reads a travel pamphlet using the head-mounted device or the eyeglass computing device.

The image module 502 can also capture the travelogue image 206 by using the image capture unit 429 to capture a digital video of a portion of the travelogue 208. In doing so, the image module 502 can capture the travelogue image 206 as one or more digital video frames. For example, the image module 502 can capture the travelogue image 206 by using the image capture unit 429 to capture a video of one or more pages from a travel guide. As an additional example, the image module 502 can capture the travelogue image 206 by using the image capture unit 429 to capture a video of a hiking map.

The image module 502 can store the travelogue image 206 in the first storage unit 414 of FIG. 4, the second storage unit 446 of FIG. 4, or a combination thereof. Moreover, the image module 502 can receive or retrieve the travelogue image 206 from another device connected to the navigation system 100. The image module 502 can access the travelogue image 206 using the first storage interface 424 of FIG. 4.

The image module 502 can be part of the first software 426 of FIG. 4, the second software 442 of FIG. 4, or a combination thereof. The first control unit 412 of FIG. 4 can execute the first software 426, the second control unit 434 of FIG. 4 can execute the second software 442, or a combination thereof to capture the travelogue image 206.

Moreover, the image module 502 can also communicate the travelogue image 206 between devices through the first communication unit 416, the second communication unit 436, or a combination thereof. After capturing the travelogue image 206, the control flow can pass from the image module 502 to the set extraction module 504.

The set extraction module 504 is configured to generate the extracted interest set 216 of FIG. 2. The set extraction module 504 can generate the extracted interest set 216 based on the travelogue image 206. The set extraction module 504 can also generate the extracted interest set 216 by organizing the candidate points 212 of FIG. 2 according to the geographic area 214 of FIG. 2, the activity type 220 of FIG. 3, the travelogue suggestion 210 of FIG. 3 concerning the candidate points 212, or a combination thereof. The set extraction module 504 will be discussed in greater detail below.

The set extraction module 504 can be part of the first software 426, the second software 442, or a combination thereof. The first control unit 412 can execute the first software 426, the second control unit 434 can execute the second software 442, or a combination thereof to generate the extracted interest set 216.

Moreover, the set extraction module 504 can also communicate the extracted interest set 216 between devices through the first communication unit 416, the second communication unit 436, or a combination thereof. After generating the extracted interest set 216, the control flow can pass from the set extraction module 504 to the route generation module 506.

The route generation module 506 is configured to calculate the candidate routes 336 of FIG. 3 between the candidate points 212. The route generation module 506 can calculate the candidate routes 336 for guiding the user 204 from the starting location 338 of FIG. 3 to one of the candidate points 212, between the candidate points 212, and from one of the candidate points 212 back to the endpoint 340 of FIG. 3.

The route generation module 506 can calculate the candidate routes 336 based on the geographic locations or coordinates of the starting location 338, the candidate points 212, and the endpoint 340. For example, the route generation module 506 can calculate the candidate routes 336 by determining all possible navigation paths linking the starting location 338 to each of the candidate points 212, each of the candidate points 212 to each of the other instances of the candidate points 212, and each of the candidate points 212 to the endpoint 340.

As a more specific example, the route generation module 506 can calculate the candidate routes 336 using a tree traversal mechanism, a graph traversal mechanism, or a combination thereof. As an additional example, the route generation module 506 can calculate the candidate routes 336 using a Dijkstra's algorithm, a Bellman-Ford algorithm, an A-star algorithm, a bidirectional algorithm, a Floyd-Warshall algorithm, an iterative deepening algorithm, a shortest path algorithm, or a combination thereof.

The route generation module 506 can also determine the traffic condition 342 of FIG. 3 on the candidate routes 336. The route generation module 506 can determine the traffic condition 342 on the candidate routes 336 by accessing a real-time traffic database, a crowd-sourced traffic database, or a combination thereof.

Moreover, the route generation module 506 can determine the traffic condition 342 based on historical traffic patterns. Additionally, the route generation module 506 can determine the traffic condition 342 by receiving or retrieving information concerning road closures, road conditions, weather, or accidents from another device in the navigation system 100.

The route generation module 506 can then store the candidate routes 336 in the first storage unit 414, the second storage unit 446, or a combination thereof. The route generation module 506 can also use the first user interface 418 of FIG. 4, the second user interface 438 of FIG. 4, or a combination thereof to communicate the candidate routes 336 to the user 204.

The route generation module 506 can be part of the first software 426, the second software 442, or a combination thereof. The first control unit 412 can execute the first software 426, the second control unit 434 can execute the second software 442, or a combination thereof to calculate the candidate routes 336.

Moreover, the route generation module 506 can also communicate the candidate routes 336 between devices through the first communication unit 416, the second communication unit 436, or a combination thereof. After calculating the candidate routes 336, the control flow can pass from the route generation module 506 to the constraint module 508.

The constraint module 508 is configured to determine the resource constraint 308 of FIG. 3. The constraint module 508 can determine the resource constraint 308 for determining the amount of available temporal, material, or monetary resources to allocate to the candidate points 212. The resource constraint 308 can include the time constraint 314 of FIG. 3, the fuel constraint 320 of FIG. 3, the budgetary constraint 322 of FIG. 3, or a combination thereof. In addition, the fuel constraint 320 can include a fuel level, a fuel cost, or a combination thereof.

The constraint module 508 can determine the time constraint 314, including the start time 316 of FIG. 3 and the end time 318 of FIG. 3, by accessing a calendar application, a time-keeping application, a reminder application, a correspondence, or a combination thereof on the first device 102, the second device 106, or a combination thereof. For example, the constraint module 508 can determine the time constraint 314 by accessing the calendar application to determine a flight departure time, a flight arrival time, an appointment or a reservation, a lodging check-out time, a lodging check-in time, or a combination thereof.

The constraint module 508 can determine the fuel constraint 320, including current instances of the fuel level, by querying an engine control unit of a vehicle of the user 204. In addition, the constraint module 508 can determine the fuel constraint 320, including current instances of the fuel level, based on a distance traveled along a navigation path since the last time the vehicle of the user 204 stopped at a fueling station to refuel. Moreover, the constraint module 508 can determine the fuel constraint 320 based on a user input.

The constraint module 508 can determine the fuel constraint 320 representing the fuel cost by retrieving cost information from an Energy Information Administration (EIA) database, a Department of Transportation (DOT) database, or a combination thereof. In addition, the fuel cost can be predetermined by the navigation system 100. Moreover, the constraint module 508 can determine the fuel cost based on a user input.

The constraint module 508 can determine the budgetary constraint 322 by accessing a banking application, a budgeting application, or a combination thereof on the first device 102, the second device 106, or a combination thereof. In addition, the constraint module 508 can determine the budgetary constraint 322 based on a user input.

The constraint module 508 can be part of the first software 426, the second software 442, or a combination thereof. The first control unit 412 can execute the first software 426, the second control unit 434 can execute the second software 442, or a combination thereof to determine the resource constraint 308.

Moreover, the constraint module 508 can also communicate the resource constraint 308 between devices through the first communication unit 416, the second communication unit 436, or a combination thereof. After determining the resource constraint 308, the control flow can pass from the constraint module 508 to the preference module 510.

The preference module 510 is configured to determine the user preference 310 of FIG. 2. The preference module 510 can determine the user preference 310 for determining which of the candidate points 212 the user 204 is interested in visiting. The user preference 310 can include the activity preference 324 of FIG. 3, the geographic preference 326 of FIG. 3, or a combination thereof.

The preference module 510 can determine the user preference 310 based on the navigation history 330 of FIG. 3, the user-generated content 328 of FIG. 3, or a combination thereof. For example, the navigation history 330 can include a list of POIs or destinations visited by the user 204 during a predetermined time period. The preference module 510 can determine the activity preference 324 by analyzing the activity type 220 of POIs or destinations in the navigation history 330 of the user 204. As an additional example, the preference module 510 can also determine the geographic preference 326 by analyzing the geographic area 214 of the POIs or destinations in the navigation history 330 of the user 204.

The preference module 510 can also determine the user preference 310 based on the user-generated content 328 including user-generated reviews, user-generated commentary, user photos, or a combination thereof. For example, the preference module 510 can determine the activity preference 324 by analyzing the user-generated reviews, the user-generated commentary, the user photos, or a combination thereof for the activity type 220 most often undertaken by the user 204 within a predetermined time period. As a more specific example, the preference module 510 can determine the activity preference 324 by analyzing trip reviews generated by the user 204 on a travel website.

As an additional example, the preference module 510 can apply an image classification algorithm or a text mining algorithm such as a deep learning algorithm, a deep neural network algorithm, a convolutional deep neural network algorithm, a deep belief network algorithm, or a combination thereof to the user-generated content 328 such as the user-generated reviews, the user-generated commentary, the user photos, or a combination thereof. In addition, the preference module 510 can determine the user preference 310 based on a user input.

The preference module 510 can also determine the user preference 310 with respect to the time constraint 314, the fuel constraint 320, the budgetary constraint 322, or a combination thereof. For example, the user preference 310 can be a predilection of the user 204 to satisfy the time constraint 314 at the expense of the fuel constraint 320 or the budgetary constraint 322. Moreover, the user preference 310 can be a predilection of the user 204 to satisfy the budgetary constraint 322 at the expense of the time constraint 314.

The preference module 510 can be part of the first software 426, the second software 442, or a combination thereof. The first control unit 412 can execute the first software 426, the second control unit 434 can execute the second software 442, or a combination thereof to determine the user preference 310.

Moreover, the preference module 510 can also communicate the user preference 310 between devices through the first communication unit 416, the second communication unit 436, or a combination thereof. After determining the user preference 310, the control flow can pass from the preference module 510 to the itinerary module 512.

The itinerary module 512 is configured to generate the travel itinerary 302 of FIG. 3. The itinerary module 512 can generate the travel itinerary 302 based on the extracted interest set 216, the resource constraint 308, the user preference 310, the travel context 312 of FIG. 3, the navigation history 330, the candidate routes 336, or a combination thereof. The itinerary module 512 will be discussed in greater detail below.

The itinerary module 512 can be part of the first software 426, the second software 442, or a combination thereof. The first control unit 412 can execute the first software 426, the second control unit 434 can execute the second software 442, or a combination thereof to generate the travel itinerary 302.

Moreover, the itinerary module 512 can also communicate the travel itinerary 302 between devices through the first communication unit 416, the second communication unit 436, or a combination thereof. After generating the travel itinerary 302, the control flow can pass from the itinerary module 512 to the route selection module 514.

The route selection module 514 is configured to calculate the navigation route 334 of FIG. 3 based on the candidate routes 336, the travel itinerary 302, the extracted interest set 216, the resource constraint 308, the traffic condition 342, or a combination thereof. The route selection module 514 can calculate the navigation route 334 by selecting one or more instances of the candidate routes 336 for traversing to, between, and from one or more instances of the interest point 304 according to the activity sequence 306 of the travel itinerary 302. The route selection module 514 can select the candidate routes 336 in a number of ways.

The route selection module 514 can select the candidate routes 336 by balancing or prioritizing the user preference 310 concerning the time constraint 314, the budgetary constraint 322, the fuel constraint 320, or a combination thereof. For example, the route selection module 514 can select the candidate routes 336 to minimize the amount of travel time from one instance of the interest point 304 to another.

The route selection module 514 can minimize the amount of travel time by prioritizing the time constraint 314 over the fuel cost or the fuel consumption. As a more specific example, the route selection module 514 can select longer instances of the candidate routes 336 when the longer instances of the candidate routes 336 results in shorter instances of the travel time between instances of the interest point 304.

As an additional example, the route selection module 514 can select the candidate routes 336 to minimize the fuel cost or the fuel consumption. The route selection module 514 can minimize the fuel cost or fuel consumption by selecting the shortest instances of the candidate routes 336. In this example, the route selection module 514 can select the shortest instances of the candidate routes 336 even when such routes results in longer instances of the travel time due to the traffic condition 342.

The route selection module 514 can also select the candidate routes 336 based on a user input. For example, the route selection module 514 can receive an input from the user 204 to avoid highways or other high speed roadways. The route selection module 514 can calculate the navigation route 334 based on such user input.

The route selection module 514 can also interact with the route generation module 506 and the itinerary module 512 to adjust any of the candidate routes 336, the travel itinerary 302, or a combination thereof based on the traffic condition 342. For example, the route selection module 514 can pass the control flow back to the itinerary module 512 to adjust the activity sequence 306 to accommodate new developments concerning the traffic condition 342 such as new accidents on the candidate routes 336 or new road closures.

As a more specific example, the route selection module 514 can determine the traffic condition 342 on all of the candidate routes 336 between the interest point 304 currently listed as the third destination on the travel itinerary 302 and the interest point 304 currently listed as the fourth destination on the travel itinerary 302 has caused the commute time to increase in excess of one hour. In this case, the route selection module 514 can analyze the traffic condition 342 between other instances of the interest point 304 on the travel itinerary 302 and interact with the itinerary module 512 to adjust the activity sequence 306 by switching the order of the third destination and the fourth destination.

In addition, the route selection module 514 can also pass the control flow back to the itinerary module 512 to remove one or more instances of the interest point 304 from the travel itinerary 302 based on new developments concerning the traffic condition 342. In this way, the route selection module 514 and the itinerary module 512 work together to iteratively generate the travel itinerary 302 and calculate the navigation route 334.

The route selection module 514 can store the navigation route 334 in the first storage unit 414, the second storage unit 446, or a combination thereof. The route selection module 514 can also use the first user interface 418, the second user interface 438, or a combination thereof to communicate the navigation route 334 to the user 204.

The route selection module 514 can be part of the first software 426, the second software 442, or a combination thereof. The first control unit 412 can execute the first software 426, the second control unit 434 can execute the second software 442, or a combination thereof to calculate the navigation route 334.

Moreover, the route selection module 514 can also communicate the navigation route 334 between devices through the first communication unit 416, the second communication unit 436, or a combination thereof. After calculating the navigation route 334, the control flow can pass from the route selection module 514 to the suggestion module 516.

The suggestion module 516 is configured to generate the convenience suggestion 344 of FIG. 3, the attraction suggestion 346 of FIG. 3, or a combination thereof based on the navigation route 334, the travel itinerary 302, the user preference 310, the resource constraint 308, or a combination thereof. The suggestion module 516 can generate the convenience suggestion 344 for recommending the convenience point 348 of FIG. 3 along the navigation route 334.

The convenience point 348 can include a fueling station, a dining establishment, a restroom stop, a lodging establishment, or a combination thereof. The suggestion module 516 can generate the convenience suggestion 344 by retrieving location and operational information concerning the convenience point 348 from a POI database, a map database, a crowd-sourced database, a user-generated database, or a combination thereof.

The suggestion module 516 can take into account the navigation route 334, the travel itinerary 302, and the time constraint 314 when deciding on the convenience point 348. For example, the constraint module 508 can determine the current instance of the fuel level by querying the engine control unit of a vehicle driven by the user 204. The constraint module 508 can predict the vehicle will run out of gas after approximately 50 miles. The suggestion module 516 can identify a gas station along the navigation route 334 approximately 40 miles from the starting location 338. In this example, the suggestion module 516 can pass the control flow back to the itinerary module 512 to include the gas station representing the convenience point 348 as part of the travel itinerary 302.

As an additional example, the suggestion module 516 can identify a diner along the navigation route 334 in between the fourth and fifth instances of the interest point 304 included as part of the travel itinerary 302. The suggestion module 516 can also access the travel itinerary 302 and determine the fourth and fifth instances of the interest point 304 are scheduled around noon in the travel itinerary 302. The suggestion module 516 can then communicate the diner representing the convenience suggestion 344 to the user through the first user interface 418, the second user interface 438, or a combination thereof.

It has been discovered that generating the convenience suggestion 344 based on the navigation route 334 provides for an improved user experience during the planned excursion or trip. For example, by scheduling rest stops or dining stops in advance, the navigations system 100 can anticipate a biological or logistical need of the user 204 before it arises. The navigation system 100 can also cut down on unanticipated detours or stops along the navigation route 334 to save time and money.

The suggestion module 516 can also generate the attraction suggestion 346 for recommending an attraction point 350 other than that indicated or depicted in the travelogue image 206. The attraction point 350 can be a POI suggested by the navigation system 100 but not included as part of the travelogue image 206. The suggestion module 516 can generate the attraction suggestion 346 based on the navigation route 334, the travel itinerary 302, the user preference 310 and information from the extracted interest set 216.

For example, the suggestion module 516 can access the extracted interest set 216 and determine the activity type 220 of the candidate points 212 as sightseeing activities. The suggestion module 516 can then access the navigation route 334 and identify an additional sightseeing destination along the navigation route 334 not included as part of the extracted interest set 216. The suggestion module 516 can then pass the control flow back to the itinerary module 512 to include the additional sightseeing destination as part of the travel itinerary 302.

As an additional example, the preference module 510 can determine the user preference 310 for artisan pizza based on an analysis of user-generated reviews, user-generated commentary, or user photos concerning artisan pizza. The suggestion module 516 can generate the attraction suggestion 346 by identifying an artisan pizzeria along the navigation route 334 not recommended by the travelogue 208. The suggestion module 516 can communicate the attraction suggestion 346 to the user 204 by suggesting the user 204 add the artisan pizzeria to the travel itinerary 302.

The suggestion module 516 can generate the convenience suggestion 344, the attraction suggestion 346, or a combination thereof automatically or based on a user input. For example, the suggestion module 516 can pass the control flow back to the itinerary module 512 to include an instance of the convenience point 348 or the attraction point 350 to the travel itinerary 302 only upon an input from the user. As an additional example, the suggestion module 516 can automatically pass the control flow back to the itinerary module 512 to update the travel itinerary 302 when an instance of the convenience point 348 or the attraction point 350 is identified.

It has been discovered that generating the attraction suggestion 346 based on the navigation route 334 and the user preference 310 increases an engagement level of the user 204 with the navigation system 100. For example, the user 204 is more prone to use the navigation system 100 to capture additional instances of the travelogue image 206 and generate additional instances of the travel itinerary 302 to see what instances of the attraction suggestion 346 the navigation system 100 recommends based on the travelogue image 206 and the user preference 310.

It has further been discovered that generating the attraction suggestion 346 based on the navigation route 334 and the user preference 310 provides for an improved user experience as the navigation system 100 is able to generate travel suggestions for the user 204 without active input from the user 204. For example, the navigation system 100 can generate the attraction suggestion 346 by analyzing the user-generated content 328, the navigation history 330, or a combination thereof for destinations or activities that might interest the user 204 based on past photos or reviews generated by the user 204.

The suggestion module 516 can be part of the first software 426, the second software 442, or a combination thereof. The first control unit 412 can execute the first software 426, the second control unit 434 can execute the second software 442, or a combination thereof to generate the convenience suggestion 344, the attraction suggestion 346, or a combination thereof.

Moreover, the suggestion module 516 can also communicate the convenience suggestion 344, the attraction suggestion 346, or a combination thereof between devices through the first communication unit 416, the second communication unit 436, or a combination thereof. After generating the convenience suggestion 344, the attraction suggestion 346, or a combination thereof, the control flow can pass from the suggestion module 516 to the route adjustment module 518.

The route adjustment module 518 is configured to dynamically update the navigation route 334. The route adjustment module 518 can dynamically update the navigation route 334 based on the detour period 352 of FIG. 3 exceeding the proposed stoppage duration 332. The route adjustment module 518 can dynamically update the navigation route 334 by adjusting the navigation route 334 in real time based on changes in the traffic condition 342, the proposed stoppage duration 332, the current location 354, or a combination thereof.

The detour period 352 can exceed the proposed stoppage duration 332 when the user 204 visits or stays at an instance of the interest point 304 for a longer period of time than recommended by the proposed stoppage duration 332. The route adjustment module 518 can determine when the detour period 352 exceeds the proposed stoppage duration 332 by tracking or monitoring the current location 354 of FIG. 3 of the user 204 relative to the navigation route 334.

The route adjustment module 518 can use the location unit 420 of FIG. 4, the first communication unit 416, the second communication unit 436, or a combination thereof to determine the current location 354. The route adjustment module 518 can determine the user 204 has detoured away from the navigation route 334 or has exceeded the proposed stoppage duration 332 by comparing the current location 354 of the user 204 with the geographic location or coordinate projected by the navigation route 334 and the travel itinerary 302.

For example, the travel itinerary 302 indicates the user 204 should be en route to the fifth instance of the interest point 304 listed in the travel itinerary 302 by 2:45 pm. The route adjustment module 518 can determine the user 204 is still at the second instance of the interest point 304 listed in the travel itinerary at 2:45 pm based on the current location 354. At this point, the route adjustment module 518 can generate the interest alert 356 of FIG. 3 to notify the user 204 concerning an upcoming instance of the interest point 304 on the travel itinerary 302.

The interest alert 356 can include a message window, a pop window, a push notification, a text message, or a combination thereof concerning the interest point 304. For example, the route adjustment module 518 can generate the interest alert 356 to notify the user 204 of an impending closing time of an upcoming instance of the interest point 304 listed on the travel itinerary 302.

Moreover, the route adjustment module 518 can also dynamically update the navigation route 334 by passing the control flow back to the itinerary module 512, the route selection module 514, or a combination thereof. For example, the route adjustment module 518 can pass the control flow back to the itinerary module 512 to remove one or more remaining instances of the interest point 304 from the travel itinerary 302. In addition, the route adjustment module 518 can pass the control flow back to the route selection module 514 to select different instances of the candidate routes 336 to reach the remaining instances of the interest point 304.

The route adjustment module 518 can be part of the first software 426, the second software 442, or a combination thereof. The first control unit 412 can execute the first software 426, the second control unit 434 can execute the second software 442, or a combination thereof to dynamically update the navigation route 334.

Moreover, the route adjustment module 518 can also communicate the updated instance of the navigation route 334 between devices through the first communication unit 416, the second communication unit 436, or a combination thereof.

Figure 6:
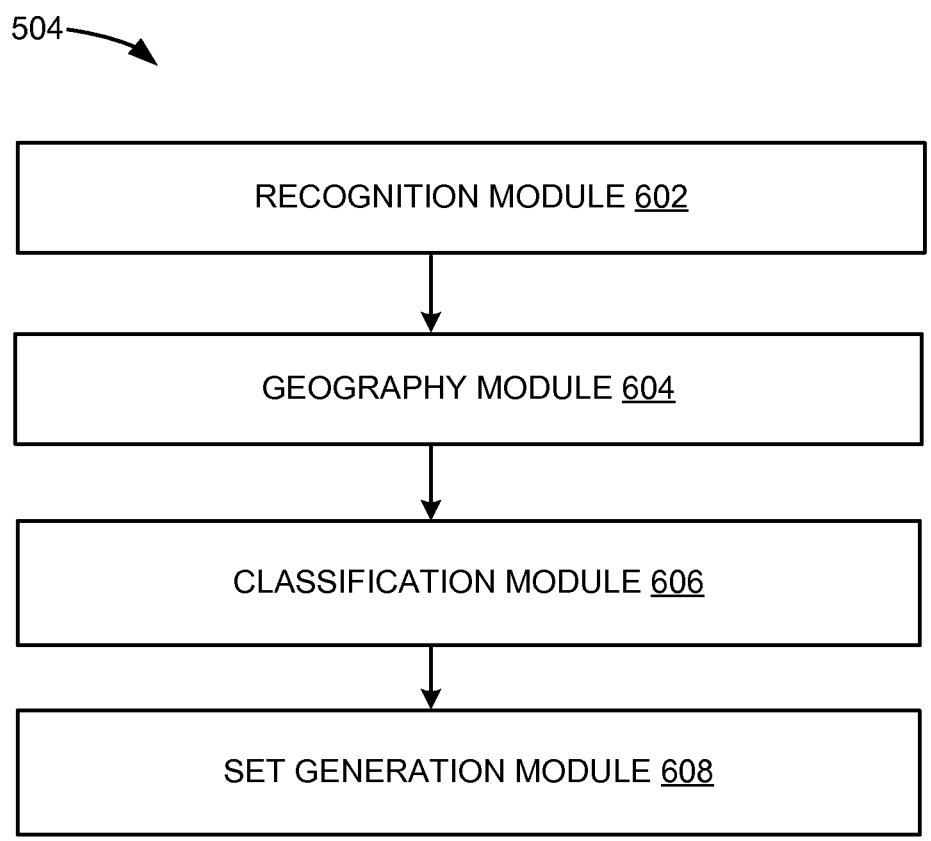
FIG. 6 is a detailed view of a portion of the control flow of the navigation system.

Referring now to FIG. 6, therein is shown a detailed view of a portion of the control flow of the navigation system 100 of FIG. 1. FIG. 6 is a detailed view of the set extraction module 504 of FIG. 5. The set extraction module 504 can include a recognition module 602, a geography module 604, a classification module 606, a set generation module 608, or a combination thereof.

The recognition module 602 is configured to extract the candidate points 212 of FIG. 2, any associated information, and the travelogue suggestion 210 of FIG. 2 concerning the candidate points 212 from the travelogue image 206 of FIG. 2. For example, the recognition module 602 can extract the candidate points 212 and the travelogue suggestion 210 by applying a recognition procedure such as an optical character recognition (OCR) procedure or a pattern recognition procedure on the travelogue image 206.

The recognition procedure can include a preprocessing step such as a binarization step, a segmentation step, a feature extraction step, or a combination thereof. The recognition procedure can identify and process data and information such as letters, words, pictorial images, or a combination thereof visually captured in the travelogue image 206.

The recognition module 602 can apply the recognition procedure on the travelogue image 206 for identifying the candidate points 212 and recognizing textual content concerning the candidate points 212. For example, the recognition module 602 can apply the OCR procedure to the travelogue image 206 to generate a text file of all words or alphanumeric characters on the travelogue image 206. In addition, the recognition module 602 can identify the candidate points 212 by matching words or phrases recognized in the travelogue image 206 with a list of POI names or destination names predetermined by the navigation system 100.

As an additional example, the recognition module 602 can identify the candidate points 212 by analyzing the textual content obtained through the OCR procedure. For example, the recognition module 602 can identify the candidate points 212 by applying a natural language parsing algorithm, a text mining algorithm, a named-entity recognition algorithm, or a combination thereof to the textual content obtained through the OCR procedure.

As a more specific example, the recognition module 602 can compare the textual content obtained through the OCR procedure with names of known points-of-interest (POIs), landmarks, or destinations contained in a POI database. In addition, the recognition module 602 can identify the candidate points 212 by performing a proximity search of all words or phrases near keywords such as "visit," "explore," or "see" contained in the travelogue image 206.

The recognition module 602 can also identify the candidate points 212 by analyzing a pictorial content or a map depicted in the travelogue image 206. For example, the recognition module 602 can identify the candidate points 212 by applying an image classification algorithm such as a deep learning algorithm, a deep neural network algorithm, a convolutional deep neural network algorithm, a deep belief network algorithm, or a combination thereof to the pictorial content or the map of the travelogue image 206.

As a more specific example, the recognition module 602 can analyze the pictorial content contained in the travelogue image 206 and identify a structure depicted in the pictorial image as a landmark such as the Golden Gate Bridge or Coit Tower. In this example, the recognition module 602 can apply a pattern matching algorithm to the pictorial image and compare the pictorial image with known images of POIs from a POI database.

When the recognition module 602 associates a pictorial image or content contained in the travelogue image 206 with an instance of the candidate points 212, the recognition module 602 can crop a portion of the image or content from the travelogue image 206 and store the pictorial image or content as part of the extracted interest set 216 in the first storage unit 414 of FIG. 4, the second storage unit 446 of FIG. 4, or a combination thereof.

The recognition module 602 can also apply the recognition procedure on the travelogue image 206 for extracting the travelogue suggestion 210. The travelogue suggestion 210 can include advice, cautionary warnings, recommendations, directions, or a combination thereof concerning the candidate points 212. The recognition module 602 can extract the travelogue suggestion 210 by applying a natural language parsing algorithm, a text mining algorithm, or a combination thereof to the textual content obtained through the recognition procedure.

For example, the recognition module 602 can extract the travelogue suggestion 210 by performing a proximity search of words or phrases near keywords such as "tip," "information," or "helpful" contained in the travelogue image 206. As an additional example, the recognition module 602 can extract the travelogue suggestion 210 by searching the content obtained through the recognition procedure for numeric values including dollar amounts, time periods, or address numbers concerning the candidate points 212. The recognition module 602 can then associate the travelogue suggestion 210 with the corresponding instances of the candidate points 212 and store the travelogue suggestion 210 in the first storage unit 414, the second storage unit 446, or a combination thereof as part of the extracted interest set 216.

It has been discovered that using the first device 102 of FIG. 1 to extract the candidate points 212 and the travelogue suggestion 210 from the travelogue image 206 enhances the usability of the first device 102 beyond a navigation device. The first device 102 can be utilized to provide navigation instructions based on recognizing contextual or background information concerning points of interest or travel destinations from using physical sources. The recognized information can be used to further recognize the context regarding the user, and to provide richer and more relevant information and features to the user.

The recognition module 602 can be part of the first software 426 of FIG. 4, the second software 442 of FIG. 4, or a combination thereof. The first control unit 412 of FIG. 4 can execute the first software 426, the second control unit 434 of FIG. 4 can execute the second software 442, or a combination thereof to identify the candidate points 212.

Moreover, the recognition module 602 can also communicate the candidate points 212 between devices through the first communication unit 416 of FIG. 4, the second communication unit 436 of FIG. 4, or a combination thereof. After identifying the candidate points 212, the control flow can pass from the recognition module 602 to the geography module 604.

The geography module 604 is configured to generate the geographic cluster 218 of FIG. 2 of the candidate points 212. The geography module 604 can generate the geographic cluster 218 for grouping the candidate points 212 by one or more instances of the geographic area 214 of FIG. 2. The geographic area 214 can include a state, a county, a municipal region, a zip code, an area code, a coordinate range, or a combination thereof.

The geography module 604 can generate the geographic cluster 218 by determining the geographic locations or geographic coordinates of the candidate points 212. The geography module 604 can determine the geographic locations or geographic coordinates of the candidate points 212 by retrieving or receiving location or coordinate information from a Geographic Information System (GIS) database, a Global Navigation Satellite System (GNSS) database, a map database management system, a Global Positioning System (GPS) database, a user-generated database, or a combination thereof. The geography module 604 can also match the travelogue image 206 or portions therein to similar patterns or locations in the map database, images of landmarks, logos, or a combination thereof based on locating the candidate points.

The geography module 604 can then generate the geographic cluster 218 by classifying the candidate points 212 by the state, the province, the county, the municipal region, the zip code, the area code, or the coordinate range in which the candidate points 212 are located. The geography module 604 can use tags or identifiers to associate the candidate points 212 with one or more instances of the geographic cluster 218. The geography module 604 can also generate a hierarchy of multiple instances of the geographic cluster 218. For example, the geography module 604 can generate one instance of the geographic cluster 218 by cities and another instance of the geographic cluster 218 by neighborhoods within one of the cities.

The geography module 604 can also generate the geographic cluster 218 based on a kernel density estimation including a multivariate kernel density estimation, a full bandwidth matrix estimation, a diagonal bandwidth matrix estimation, or a combination thereof. For example, the geography module 604 can apply a weight to a first instance of the candidate points 212 as a results of the number of other instances of the candidate points 212 in the vicinity of the first instance of the candidate points 212. The geography module 604 can then select the most heavily weighted instance of the candidate points 212 as representative of the geographic cluster 218 for all of the candidate points 212.

The geography module 604 can further determine a list of associated or relevant POIs based on determining the geographic locations of the candidate points 212. The geography module 604 can search various sources to identify POIs within a predetermined distance from the candidate points 212, the geographic cluster 218, or a combination thereof.

For example, the geography module 604 can identify restaurants, accommodations, convenience stores, bathrooms, shopping areas, novelty shops, or a combination thereof geographically proximate to the candidate points 212, the geographic cluster 218, or a combination thereof. Also for example, the geography module 604 can identify preferred instances of the POI nearby the candidate points 212, the geographic cluster 218, or a combination thereof based on past user ratings, received messages, blogs, review sites, recommendations from friends or other users with similar preferences on social media sites, or a combination thereof.

The geography module 604 can be part of the first software 426, the second software 442, or a combination thereof. The first control unit 412 can execute the first software 426, the second control unit 434 can execute the second software 442, or a combination thereof to generate the geographic cluster 218.

Moreover, the geography module 604 can also communicate the geographic cluster 218 between devices through the first communication unit 416, the second communication unit 436, or a combination thereof. After generating the geographic cluster 218, the control flow can pass from the geography module 604 to the classification module 606.

The classification module 606 is configured to organize the candidate points 212 by the activity type 220 of FIG. 2. As discussed previously, the activity type 220 can refer to a travel-related deed or action commonly undertaken at the candidate points 212. For example, the activity type 220 can include a sightseeing activity, a food-related activity, a shopping activity, a sporting activity, an outdoor activity, an indoor activity, a physical activity, a stationary activity, or a combination thereof.

The classification module 606 can organize the candidate points 212 by the activity type 220 based on the textual content obtained through the recognition procedure. For example, the travelogue image 206 can contain suggestions for activities at one or more of the candidate points 212. The classification module 606 can determine the activity type 220 by applying a natural language parsing algorithm, a text mining algorithm, a named-entity recognition algorithm, or a combination thereof to the textual content contained in the travelogue image 206.

In addition, the classification module 606 can organize the candidate points 212 by the activity type 220 by receiving or retrieving information from a POI database, a user-generated database, a crowd-sourced database, or a combination thereof. For example, the classification module 606 can search the POI database for an activity field where each entry in the activity field is an activity or function commonly associated with each of the POIs. As an additional example, the classification module 606 can search a crowd-sourced database of a travel advisory website to determine the activity type 220 associated with each of the candidate points 212. Furthermore, the classification module 606 can determine the activity type 220 by receiving an input from the user 204 or another device connected to the navigation system 100.

The classification module 606 can be part of the first software 426, the second software 442, or a combination thereof. The first control unit 412 can execute the first software 426, the second control unit 434 can execute the second software 442, or a combination thereof to organize the candidate points 212 by the activity type 220.

Moreover, the classification module 606 can also communicate the activity type 220 between devices through the first communication unit 416, the second communication unit 436, or a combination thereof. After organizing the candidate points 212 by the activity type 220, the control flow can pass from the classification module 606 to the set generation module 608.

The set generation module 608 is configured to generate the extracted interest set 216 of FIG. 2. The set generation module 608 can generate the extracted interest set 216 based on the candidate points 212, one or more instances of the geographic cluster 218, one or more instances of the activity type 220, or a combination thereof. The set generation module 608 can generate the extracted interest set 216 as a relational database, an array database, a key-value database, a columnar database, an object orientated database, or a combination thereof. As a more specific example, the set generation module 608 can generate the extracted interest set 216 as an adjacency array, a hierarchical array, or a combination thereof.

The set generation module 608 can generate the extracted interest set 216 by generating multiple lists or arrays of the candidate points 212 based on the geographic cluster 218, the activity type 220, or a combination thereof. The set generation module 608 can also generate the extracted interest set 216 by narrowing down the candidate points 212 to a smaller subset of the candidate points 212. Narrowing down the candidate points 212 will be discussed in detail below.

The set generation module 608 can store as part of the extracted interest set 216 the travelogue suggestion 210 obtained from the recognition procedure or the pictorial content concerning the candidate points 212 from the travelogue image 206. The set generation module 608 can store the extracted interest set 216 in the first storage unit 414, the second storage unit 446, or a combination thereof.

The set generation module 608 can be part of the first software 426, the second software 442, or a combination thereof. The first control unit 412 can execute the first software 426, the second control unit 434 can execute the second software 442, or a combination thereof to generate the extracted interest set 216. Moreover, the set generation module 608 can also communicate the extracted interest set 216 between devices through the first communication unit 416, the second communication unit 436, or a combination thereof.

Figure 7:
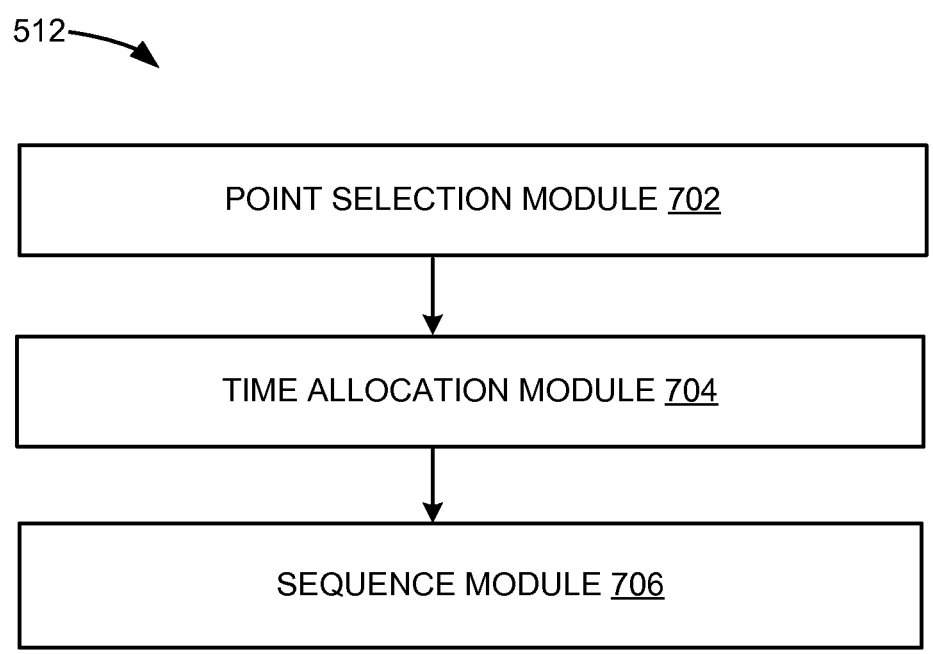
FIG. 7 is another detailed view of a portion of the control flow of the navigation system.

Referring now to FIG. 7, therein is shown a detailed view of a portion of the control flow of the navigation system 100 of FIG. 1. FIG. 7 is a detailed view of the itinerary module 512 of FIG. 5. The itinerary module 512 can include a point selection module 702, a time allocation module 704, a sequence module 706, or a combination thereof.

The point selection module 702 is configured to select one or more instances of the interest point 304 of FIG. 3 from the candidate points 212 of FIG. 2 for inclusion in the travel itinerary 302 of FIG. 3. The point selection module 702 can select instances of the interest point 304 based on information from the extracted interest set 216 of FIG. 2, the resource constraint 308 of FIG. 3, the user preference 310 of FIG. 3, the travel context 312 of FIG. 3, the candidate routes 336 of FIG. 3, or a combination thereof.

For example, the point selection module 702 can select instances of the interest point 304 by first filtering the candidate points 212 based on the user preference 310. For example, the point selection module 702 can match the user preference 310 including the activity preference 324 of FIG. 3 and the geographic preference 326 of FIG. 3 with the activity type 220 and the geographic area 214, respectively, of the candidate points 212.

As an additional example, the point selection module 702 can match the activity preference 324 with suggestions for activities provided by the travelogue suggestion 210. As a more specific example, the travelogue suggestion 210 can include a recommendation to try a particular dish at one of the candidate points 212 representing a restaurant. The point selection module 702 can include the restaurant as an instance of the interest point 304 based on the activity preference 324 of the user 204 for trying new cuisines. In addition, the point selection module 702 can select the interest point 304 by matching the activity type 220 detected in the user-generated content 328 with the activity type 220 associated with one or more of the candidate points 212. For example, the point selection module 702 can select one of the candidate points 212 representing a hiking trail as an instance of the interest point 304 based on user photos depicting the user 204 on hikes across the country.

The point selection module 702 can also analyze the navigation history 330 of FIG. 3 and the travel context 312 of the user 204 to determine whether instances of the candidate points 212 should be removed from inclusion in the travel itinerary 302. For example, the navigation history 330 can include data or information on whether the user 204 has previously searched for or visited any of the candidate points 212. The point selection module 702 can also determine whether the user 204 has previously visited any of the candidate points 212 by accessing a calendar application, a scheduling application, an email application, or a combination thereof of the user 204.

In addition, the travel context 312 can include information on the day-of-the-week or the month concerning the start time 316 of FIG. 3, the end time 318 of FIG. 3, or a combination thereof. For example, the point selection module 702 can exclude certain instances of the candidate points 212 from the travel itinerary 302 when the start time 316 falls on a day-of-the-week or month when one of the candidate points 212 is closed or on holiday. The point selection module 702 can determine hours of non-operation for the candidate points 212 based on the travelogue suggestion 210, a POI database, a crowd-sourced database, or a combination thereof.

Moreover, the point selection module 702 can select one or more instances of the interest point 304 based on the budgetary constraint 322 of FIG. 3. For example, the point selection module 702 can estimate a cost associated with one of the candidate points 212 based on the travelogue suggestion 210, the crowd-source database, the POI database, or a combination thereof. The point selection module 702 can filter out the candidate points 212 from inclusion in the travel itinerary 302 when the costs associated with the candidate points 212 exceed the budgetary constraint 322.

As a more specific example, the user 204 can establish a budgetary threshold for capping expenditures at each instance of the interest point 304. The point selection module 702 can filter out any of the candidate points 212 when the costs associated with the candidate points 212, including admission fees, parking fees, or estimated dining bills, exceed the budgetary threshold.

Furthermore, the point selection module 702 can select one or more instances of the interest point 304 based on the traffic condition 342 of the candidate routes 336. For example, the point selection module 702 can filter out any of the candidate points 212 from inclusion in the travel itinerary 302 when the traffic condition 342 of the candidate routes 336 leading up to the candidate points 212 result in commute times exceeding a commuting threshold. As a more specific example, the point selection module 702 can exclude one of the candidate points 212 representing a vista point from inclusion in the travel itinerary 302 when the time it takes to commute to the vista point exceeds one hour.

The point selection module 702 can be part of the first software 426 of FIG. 4, the second software 442 of FIG. 4, or a combination thereof. The first control unit 412 of FIG. 4 can execute the first software 426, the second control unit 434 of FIG. 4 can execute the second software 442, or a combination thereof to select one or more instances of the interest point 304 from the candidate points 212 for inclusion in the travel itinerary 302.

Moreover, the point selection module 702 can also communicate the instances of the interest point 304 selected between devices through the first communication unit 416 of FIG. 4, the second communication unit 436 of FIG. 4, or a combination thereof. After selecting one or more instances of the interest point 304 from the candidate points 212 for inclusion in the travel itinerary 302, the control flow can pass from the point selection module 702 to the time allocation module 704.

The time allocation module 704 is configured to determine the proposed stoppage duration 332 of FIG. 3 at each instance of the interest point 304. The time allocation module 704 can determine the proposed stoppage duration 332 based on the time constraint 314, the activity type 220, the user preference 310, the travelogue suggestion 210, or a combination thereof.

The time allocation module 704 can determine the proposed stoppage duration 332 by determining the time constraint 314. The time allocation module 704 can then calculate a baseline stopping period by dividing the total amount of time indicated by the time constraint 314 by the number of instances of the interest point 304 selected by the point selection module 702. The time allocation module 704 can then adjust the baseline stopping period based on the activity type 220, the user preference 310, the travelogue suggestion 210, or a combination thereof.

For example, the time allocation module 704 can adjust the baseline stopping period for a particular instance of the interest point 304 when the travelogue suggestion 210 prescribes a visiting period different from the baseline stopping period. As a more specific example, the travelogue suggestion 210 can recommend setting aside 2 hours when visiting a particular museum. In this example, the time allocation module 704 can adjust the baseline stopping period for this particular museum to 2 hours.

The time allocation module 704 can also adjust the baseline stopping period based on the activity type 220. For example, the time allocation module 704 can adjust the baseline stopping period based on a suggested activity time appropriate for the activity type 220 of the interest point 304.

The suggested activity time can be predetermined by the navigation system 100, the user 204, a crowd-sourced database, or another device connected to the navigation system 100. For example, the time allocation module 704 can increase the baseline stopping period for an instance of the interest point 304 representing a neighborhood eatery to 1.5 hours since the suggested activity time for activities involving food is 1.5 to 2 hours. As an additional example, the time allocation module 704 can decrease the baseline stopping period for an instance of the interest point 304 representing a sightseeing destination based on a suggest activity time for sightseeing activities of 15 minutes.

Moreover, the time allocation module 704 can determine the proposed stoppage duration 332 based on the user preference 310. For example, the time allocation module 704 can add to the baseline stopping period for an instance of the interest point 304 representing a shopping destination when the extracted interest set 216 includes a highly-rated review generated by the user 204 for a similar shopping destination. As an additional example, the time allocation module 704 can add to the baseline stopping period for an instance of the interest point 304 representing a kayaking spot when the user 204 scheduled multiple kayaking trips in a calendar application.

The time allocation module 704 can ensure the total amount of time included as part of the travel itinerary 302 does not exceed the time constraint 314 by decreasing the baseline stopping period for instances of the interest point 304 which do not require set times recommended by the travelogue suggestion 210 or do not rank highly in terms of the user preference 310. The time allocation module 704 can also remove instances of the interest point 304 from the travel itinerary 302 to ensure the total amount of time does not exceed the time constraint 314.

The time allocation module 704 can be part of the first software 426, the second software 442, or a combination thereof. The first control unit 412 can execute the first software 426, the second control unit 434 can execute the second software 442, or a combination thereof to determine the proposed stoppage duration 332 at each instance of the interest point 304.

Moreover, the time allocation module 704 can also communicate the proposed stoppage duration 332 between devices through the first communication unit 416, the second communication unit 436, or a combination thereof. After determining the proposed stoppage duration 332 at each instance of the interest point 304, the control flow can pass from the time allocation module 704 to the sequence module 706.

The sequence module 706 is configured to determine the activity sequence 306 of FIG. 3 and generate the travel itinerary 302 based on the selected instances of the interest point 304, the proposed stoppage duration 332, and the activity sequence 306. The sequence module 706 can determine the activity sequence 306 in a number of ways.

The sequence module 706 can determine the activity sequence 306 based on the starting location 338, the endpoint 340, and the geographic locations or coordinates of instances of the interest point 304. The sequence module 706 can arrange the activity sequence 306 based on the proximity of the interest point 304 to either the starting location 338 or the endpoint 340. For example, the sequence module 706 can determine the activity sequence 306 by generating a geo-fence around the starting location 338 and increasing the radius of the geo-fence gradually.

In this example, the sequence module 706 can begin by generating a geo-fence with a radius of one mile and include the interest point 304 detected within the geo-fence as the first entry of the travel itinerary 302. The sequence module 706 can then increase the radius of the geo-fence in one mile increments and add instances of the interest point 304 detected within each enlargement of the geo-fence to the activity sequence 306 in the order in which they were detected.

Moreover, the sequence module 706 can undertake this same procedure to determine entries at the end of the travel itinerary 302. For example, the sequence module 706 can generate another geo-fence around the endpoint 340 and include the interest point 304 detected within this other geo-fence to the end of the activity sequence 306. The sequence module 706 can then gradually increase the radius of this geo-fence to add instances of the interest point 304 to the bottom of the activity sequence 306 in reverse order. The sequence module 706 can generate both geo-fences simultaneously, or each geo-fence on its own.

The sequence module 706 can also determine the activity sequence 306 based on the travelogue suggestion 210. For example, the travelogue suggestion 210 can include a recommendation for an ideal time to visit one or more instances of the interest point 304. As a more specific example, the travelogue suggestion 210 can recommend an instance of the interest point 304 representing a vista point as a good place to watch the sunset. In this example, the sequence module 706 can add the vista point to the end of the activity sequence 306. Also as a more specific example, the travelogue suggestion 210 can determine the activity sequence 306 based on delays at the interest point 304, current density or current total of visitors thereof, forecasted total of visitors thereof at a target time of visit, or a combination thereof.

The sequence module 706 can also determine the activity sequence 306 based on the activity type 220. For example, an instance of the interest point 304 can be a dining establishment and the activity type 220 associated with the interest point 304 can be a meal at the dining establishment. The sequence module 706 can take the activity type 220 into consideration by scheduling the dining establishment as a midday or evening activity and including the dining establishment in the middle or end of the activity sequence 306.

The sequence module 706 can also determine the activity sequence 306 based on the traffic condition 342 of the candidate routes 336 leading to or away from the interest point 304. For example, the route generation module 506 can determine the traffic condition 342 of the candidate routes 336 leading to an instance of the interest point 304 as congested during rush hour. The sequence module 706 can then prohibit the interest point 304 from being scheduled during rush hour periods and add the interest point 304 to the middle of the activity sequence 306.

Once the sequence module 706 has determined the activity sequence 306, the sequence module 706 can generate the travel itinerary 302 based on the selected instances of the interest point 304, the proposed stoppage duration 332 at each of the interest point 304, and the activity sequence 306. The sequence module 706 can generate the travel itinerary 302 in tabular form, list form, as entries in a calendar application, or a combination thereof. The sequence module 706 can also generate the travel itinerary 302 as message windows or markings overlaid on a map graphic.

The sequence module 706 can communicate the travel itinerary 302 to the user 204 through the first user interface 418, the second user interface 438, or a combination thereof. The sequence module 706 can also store the travel itinerary 302 in the first storage interface 414, the second storage interface 446, or a combination thereof.

The sequence module 706 can be part of the first software 426, the second software 442, or a combination thereof. The first control unit 412 can execute the first software 426, the second control unit 434 can execute the second software 442, or a combination thereof to determine the activity sequence 306. Moreover, the time allocation module 704 can also communicate the activity sequence 306 between devices through the first communication unit 416, the second communication unit 436, or a combination thereof.

It has been discovered that generating the travel itinerary 302 based on the user preference 310 provides for a more personalized navigation experience. For example, generating the travel itinerary 302 based on the activity preference 324 results in destinations or instances of the interest point 304 which offer activities more likely to be enjoyed by the user 204.

The physical transformation of the navigation route 334 results in movement in the physical world, such as people using the first device 102, based on the operation of the navigation system 100. As the movement in the physical world occurs, the movement itself creates additional information that is converted back into adjusting the navigation route 334 that is displayable on the display interface 202 for the continued operation of the navigation system 100 and to continue movement in the physical world.

The modules describes in this application can be ordered or partitioned differently. For example, certain modules can be combined. Each of the modules can also operate individually and independently of the other modules. Furthermore, data generated in one module can be used by another module without being directly coupled to each other.

The modules described in this application can be implemented by hardware circuitry or hardware acceleration units (not shown) in the control units. The modules described in this application can also be implemented by separate hardware units (not shown), including hardware circuitry, outside the control units but with the first device 102 or the second device 106.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices.

The modules described in this application can be implemented as instructions stored on a non-transitory computer readable medium to be executed by a first control unit 412, the second control unit 434, or a combination thereof. The non-transitory computer medium can include the first storage unit 414, the second storage unit 446, or a combination thereof. The first storage unit 414, the second storage unit 446, or a combination thereof, or a portion therein can also be made removable from the first device 102, the second device 106, or a combination thereof.

The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

Figure 8:
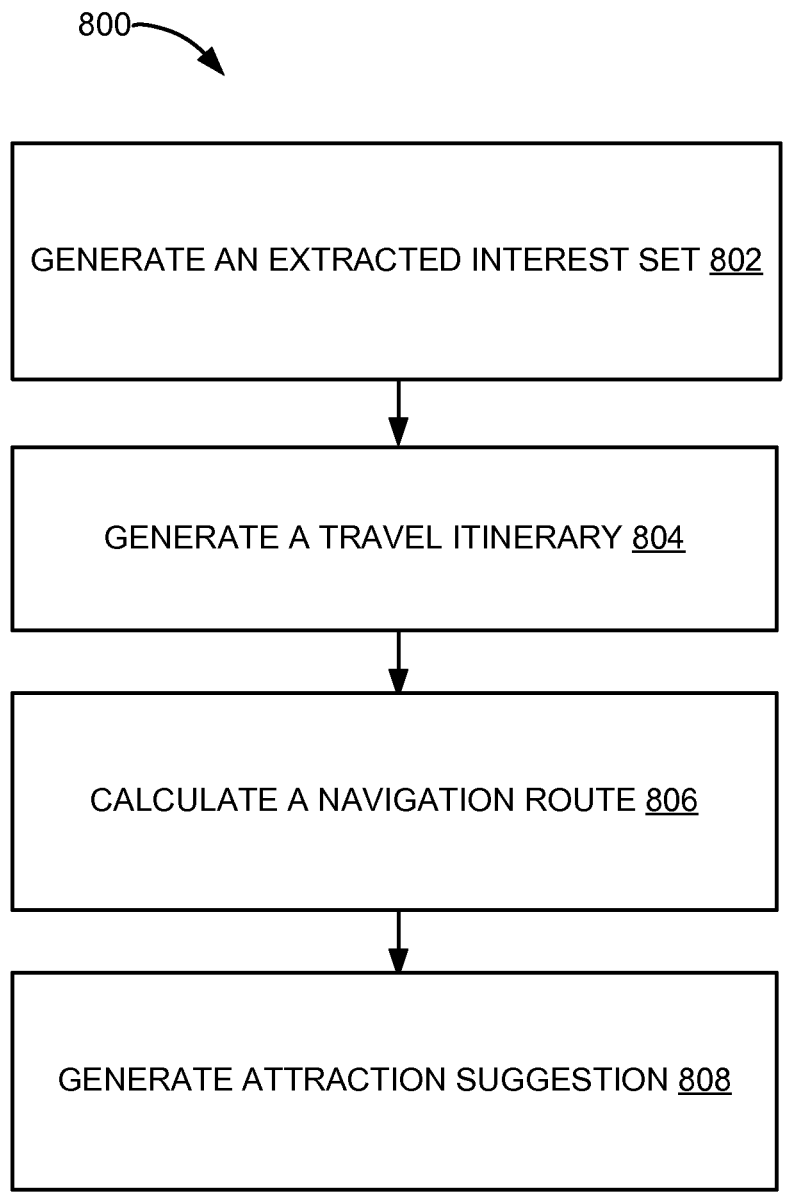
FIG. 8 is a flow chart of a method of operation of the navigation system in a further embodiment of the present invention.

Referring now to FIG. 8, therein is shown a flow chart of a method 800 of operation of the navigation system 100 of FIG. 1 in a further embodiment of the present invention. The method 800 includes: generating, with a control unit 412 of FIG. 4, the extracted interest set 216 of FIG. 2 including the interest point 304 of FIG. 3 based on the travelogue image 206 of FIG. 2 in a block 802; generating the travel itinerary 302 of FIG. 3 including the activity sequence 306 of FIG. 3 based on the extracted interest set 216 in a block 804; calculating the navigation route 334 of FIG. 3 based on the travel itinerary 302 and the extracted interest set 216 for accessing the interest point 304 in a block 806; and generating the attraction suggestion 346 of FIG. 3 based on the travel itinerary 302 and the navigation route 334 for recommending the attraction point 350 of FIG. 3 other than the interest point 304 indicated in the travelogue image 206 along the navigation route 334 in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
a storage interface, configured to:
access a travelogue image for depicting an interest point;
a control unit, coupled to the storage interface, configured to:
generate an extracted interest set, including the interest point, based on information extracted from the travelogue image;
generate a travel itinerary including an activity sequence based on the extracted interest set;
calculate a navigation route based on the travel itinerary and the extracted interest set for accessing the interest point; and
generate an attraction suggestion based on the travel itinerary and the navigation route for recommending an attraction point other than the interest point indicated in the travelogue image along the navigation route.

2. The system as claimed in claim 1 wherein the control unit is further configured to generate a convenience suggestion based on the travel itinerary and the navigation route for recommending a convenience point along the navigation route.

3. The system as claimed in claim 1 wherein the control unit is further configured to:
determine a resource constraint for accessing multiple instances of the interest point;
determine a proposed stoppage duration based on the resource constraint; and
generate the travel itinerary based on the proposed stoppage duration.

4. The system as claimed in claim 1 wherein the control unit is further configured to dynamically update the navigation route based on a detour period exceeding a proposed stoppage duration.

5. The system as claimed in claim 1 wherein the control unit is further configured to generate an interest alert based on a current location relative to the navigation route concerning an upcoming instance of the interest point on the travel itinerary.

6. The system as claimed in claim 1 wherein the control unit is further configured to:
determine an activity type for multiple instances of the interest point; and
generate the travel itinerary based on the activity type.

7. The system as claimed in claim 1 wherein the control unit is configured to generate the extracted interest set by extracting a travelogue suggestion from the travelogue image.

8. The system as claimed in claim 1 wherein the control unit is configured to generate the extracted interest set by generating a geographic cluster of multiple instances of the interest point for grouping the multiple instances of the interest point by a geographic area.

9. The system as claimed in claim 1 wherein the control unit is configured to generate the travel itinerary by matching a user preference with a travelogue suggestion.

10. The system as claimed in claim 1 wherein the control unit is further configured to calculate the navigation route based on candidate routes between one instance of the interest point and another instance of the interest point.

11. A method of operation of a navigation system comprising:

generating, with a control unit, an extracted interest set, including an interest point, based on information extracted from a travelogue image;
generating a travel itinerary including an activity sequence based on the extracted interest set;
calculating a navigation route based on the travel itinerary and the extracted interest set for accessing the interest point; and
generating an attraction suggestion based on the travel itinerary and the navigation route for recommending an attraction point other than the interest point indicated in the travelogue image along the navigation route.

12. The method as claimed in claim 11 further comprising generating a convenience suggestion based on the travel itinerary and the navigation route for recommending a convenience point along the navigation route.

13. The method as claimed in claim 11 further comprising:
determining a resource constraint for accessing multiple instances of the interest point;
determining a proposed stoppage duration based on the resource constraint; and
generating the travel itinerary based on the proposed stoppage duration.

14. The method as claimed in claim 11 further comprising dynamically updating the navigation route based on a detour period exceeding a proposed stoppage duration.

15. The method as claimed in claim 11 further comprising generating an interest alert based on a current location relative to the navigation route concerning an upcoming instance of the interest point on the travel itinerary.

16. A non-transitory computer readable medium, including instructions for execution, comprising:
generating an extracted interest set, including an interest point, based on information extracted from a travelogue image;
generating a travel itinerary including an activity sequence based on the extracted interest set; and
calculating a navigation route based on the travel itinerary and the extracted interest set for accessing the interest point; and
generating an attraction suggestion based on the travel itinerary and the navigation route for recommending an attraction point other than the interest point indicated in the travelogue image along the navigation route.

17. The non-transitory computer readable medium as claimed in claim 16 further comprising generating a convenience suggestion based on the travel itinerary and the navigation route for recommending a convenience point along the navigation route.

18. The non-transitory computer readable medium as claimed in claim 16 further comprising:
determining a resource constraint for accessing multiple instances of the interest point;
determining a proposed stoppage duration based on the resource constraint; and
generating the travel itinerary based on the proposed stoppage duration.

19. The non-transitory computer readable medium as claimed in claim 16 further comprising dynamically updating the navigation route based on a detour period exceeding a proposed stoppage duration.

20. The non-transitory computer readable medium as claimed in claim 16 further comprising generating an interest alert based on a current location relative to the navigation route concerning an upcoming instance of the interest point on the travel itinerary.

* * * * *